US00RE41190E

(19) United States
(12) Reissued Patent
Darling

(10) Patent Number: US RE41,190 E
(45) Date of Reissued Patent: Apr. 6, 2010

(54) REMOTE SUPERVISION SYSTEM AND METHOD

(75) Inventor: Jeffrey Darling, Lafayette, IN (US)

(73) Assignee: Rest Assured, LLC, Lafayette, IN (US)

(21) Appl. No.: 12/027,031

(22) Filed: Feb. 6, 2008

Related U.S. Patent Documents

Reissue of:
(64) Patent No.: 6,995,664
Issued: Feb. 7, 2006
Appl. No.: 09/885,763
Filed: Jun. 20, 2001

(51) Int. Cl.
*G08B 26/00* (2006.01)
*G08B 25/00* (2006.01)

(52) U.S. Cl. ..... 340/505; 340/502; 340/504; 340/7.21; 340/10.1; 340/10.32; 348/14.01; 348/14.02; 348/14.07; 386/46; 386/96

(58) Field of Classification Search ..... 340/505, 340/502, 504, 7.21, 10.1, 10.32, 539.1, 539.13, 340/539.23, 628, 632, 573.1, 686.1, 5.61, 340/5.62, 7.46; 348/14.01, 14.02, 14.07; 386/46, 96, E5.005
See application file for complete search history.

(56) References Cited

U.S. PATENT DOCUMENTS 4,831,438 A 5/1989 Bellman, Jr. et al.
4,838,275 A 6/1989 Lee
4,843,377 A 6/1989 Fuller et al.
4,857,912 A * 8/1989 Everett, Jr. et al. ..... 340/508
4,920,432 A * 4/1990 Eggers et al. ..... 386/96
4,962,473 A 10/1990 Crain
4,965,819 A 10/1990 Kannes
5,036,852 A 8/1991 Leishman
5,086,385 A 2/1992 Launey et al.
5,144,661 A 9/1992 Shamosh et al.
5,192,999 A 3/1993 Graczyk et al.
5,202,759 A 4/1993 Laycock
5,291,399 A 3/1994 Chaco
5,301,105 A 4/1994 Cummings, Jr.
5,319,363 A 6/1994 Welch et al.
5,412,708 A 5/1995 Katz
5,416,695 A 5/1995 Stutman et al.
5,553,609 A 9/1996 Chen et al.
6,204,762 B1 * 3/2001 Dering et al. ..... 340/541
6,344,794 B1 * 2/2002 Ulrich et al. ..... 340/539.1
6,369,847 B1 * 4/2002 James et al. ..... 348/14.01
6,383,077 B1 * 5/2002 Kweitko et al. ..... 463/40
6,498,894 B2 * 12/2002 Ito et al. ..... 386/52
6,539,393 B1 * 3/2003 Kabala ..... 707/102
7,027,708 B2 * 4/2006 Nygren et al. ..... 386/46

* cited by examiner

*Primary Examiner*—Davetta W Goins
(74) *Attorney, Agent, or Firm*—King & Schickli PLLC

(57) ABSTRACT

A new and improved method for supervising and monitoring people from a remote location comprising the use of a communication system that builds upon telecommunications connections, computer interfaces, and information management via the internet. Strategically placed web cams, microphones, speakers, and display monitors are operatively linked to computers and information management means, and are used to permit a person in a remote location to view and listen to people in a plurality of active locations to verbally or visually prompt responses to inquiries or directives. The people in the active locations may also interact via these same interconnections to the person at the remote location. Touch screen technology may be included for purposes of automated supervision of tasks performed to accomplish a particular routine by the people in the active locations. Safety devices, such as smoke detectors, carbon monoxide detectors and intrusion detectors, may also be installed to warn a remotely located supervisor, the police or fire departments, or emergency medical services.

39 Claims, 6 Drawing Sheets

REMOTE SUPERVISION SYSTEM AND METHOD

Matter enclosed in heavy brackets [ ] appears in the original patent but forms no part of this reissue specification; matter printed in italics indicates the additions made by reissue.

BACKGROUND OF THE INVENTION

*Notice: More than one reissue application has been filed for the reissue of U.S. Pat. No. 6,995,664. The reissue applications are application Ser. No. 12/027,031 (the present application), filed Feb. 6, 2008, and application Ser. No. 12/632,266, filed Dec. 7, 2009, which is a continuation reissue application.*

The present invention pertains to a system and method for supervising and monitoring a plurality of people from a remote location, and more particularly to a new and improved system and method for using an integrated network of hardware and software to produce an interactive environment between a plurality of distinct active locations and a remote location, and to a new and improved system and method for providing assisted living services to persons with cognitive disabilities that greatly increases the independence of those disabled persons at a lower cost as a result of significantly increased productivity of a daily living supervisor, without compromising the quality and effectiveness of the supervision provided.

The modern philosophy for assisting adults with cognitive disabilities to a more independent lifestyle focuses heavily on inclusion, or integrating those adults into normal living environments. This has lead to a movement of these individuals to smaller and more geographically disbursed group living arrangements supported by public finding. Over the last 35 years, the institutional population of persons with cognitive and other developmental disabilities in the United States has declined steadily from a peak of 195,000 in 1967 to 50,000 in 2001. States have closed institutions in order to reallocate institutional funds to move individualized residential alternatives in community and family settings. Between 1980 and the present, the number of community-based group homes and supervised apartments for persons with developmental disabilities in the United States increased tenfold. Nearly two-thirds of all persons with developmental disabilities service in out-of-home placements in the United States now live in homes and apartments that serve six or fewer individuals.

Demographic trends are also a driving force behind the increased demand for smaller, community residential services. As a result of advances in medical treatment, people with developmental disabilities are living longer. Twenty-five years ago, the average life span of a person with a mental disability was in the late 50s. Today, it is just a few years less than the average life span for a non-disabled adult. As a consequence, adults with developmental disabilities are outliving their caretaker parents at an increasing frequency. It is estimated that over one-quarter of all persons with developmental disabilities are presently living in a household with at least one family member 60 years of age or older.

All states face growing waiting lists for community residential or living services as a result of these trends. This exerts added pressure on government to expand living system supports. For example, in the State of Indiana, a waiting list of over 6,000 individual with developmental disabilities needing community support services existed in 1998. This was used as leverage to garner a supplemental appropriation of over $39 million in the state budget to address the needs of those on the waiting list. Even with tax revenues on the decline, the Governor has requested an additional $50 million in his budget for this issue. Legislators on both sides of the aisle have voiced support for the initiative.

As this system of community services in small settings grows, it requires the input of more and more direct services staff. This work force resource has grown increasingly scarce. Population estimates through 2008 put the growth of the total U.S. labor force at about 1.2% per year. Limitations on government reimbursement rates for provision of community services makes it difficult for providers in this area to compete with other businesses for this scarce resource.

The current method for supporting adults with mild to moderate cognitive disabilities in a community-living environment relies on face-to-face contact between a paid staff person and the adults with cognitive disability. This contact occurs primarily in the disabled person's house or, more often, apartment. A basic living routine and associated tasks are established for the disabled person with that person's input, such as times to awaken, shower, prepare meals, go to work, etc. A direct services staff person then uses prompts to assist the disabled person the daily living routine, including some individual tasks associated with these routines. Most often, these are verbal prompts interspersed with visual cues. Visual cues may include gestures by the staff person or the use of visual aids, such as a picture book sequencing meal preparation activities. The staff person is physically present in the apartment when this prompting occurs.

This method of face-to-face and one-on-one support has not changed significantly since the inception of community-based services. As the number of these service sites multiply, so does the requirement for direct services staff. In order to accommodate the growth of these services, some method must be developed to greatly increase the productivity of direct services provided in these environments. One method already recognized and in use is telephone technology. Where a disabled person can be trained to call for staff assistance at non-critical time periods, such as during overnight hours, the staff person need not be on site in the apartment with the disabled person to provide oversight and necessary supervision. This productivity enhancement allows one staff person to be at a remote location and serve many different consumers at the same time.

Therefore, it is highly desirable to provide a new and improved method for providing remote supervision of a plurality of people at different locations at the same time by one person. It is also highly desirable to provide a new and improved method whereby one supervisor can, remotely, do the work currently done by four or more supervisors who must be physically present in each supervised location to affect the guided supervision of people in those locations.

It is also highly desirable to provide a new and improved method for remote supervision that improves staff productivity. It is also highly desirable to provide a new and improved method for remote supervision that frees the time of the remote supervisor in order to allow the supervisor to direct supervision and oversight services to persons in other locations.

It is also highly desirable to provide a new and improved method for providing remote supervision of persons with cognitive disabilities living independently of each other. It is also highly desirable to provide a new and improved method for increasing the independence of persons with cognitive disabilities requiring assisted living services. It is also highly desirable to provide a new and improved method for providing remote supervision of people with cognitive disabilities living independently of each other requiring assisted living services with utilizes an integrated network of computer hardware and software that provides for an interactive environment between a plurality of persons living independently at spaced apart locations with a remote supervisor. It is also highly desirable to provide a new and improved method for providing improved remote supervision of a plurality of people at different locations living independently of each other with significantly less man hours.

It is also highly desirable to provide a new and improved method for providing remote supervision of several people with cognitive disabilities in different locations by a single remotely positioned supervisor in a society in which the number of persons needing such supervision is increasing and the number of skilled supervisors is decreasing.

It is therefore also highly desirable to provide a new and improved communication system that permits interactive communication between a remote supervisor and a plurality of people with cognitive disabilities at different locations living independently of each other. It is also highly desirable to provide a new and improved communication system that utilizes a plurality of interconnected audio, visual, and physical sensory displays, signals and prompts to supervise a plurality of persons at spaced remote locations. It is also highly desirable to provide a new and improved communication system with a means for effectively and efficiently effecting communication, for operating the plurality of displays, signals and prompts, and for collecting, organizing and accessing information to be exchanged between a remote supervisor location and a plurality of spaced active locations supervised thereby.

Finally, it is highly desirable to provide a new and improved method and system having all of the above identified features.

SUMMARY OF THE INVENTION

It is therefore an object of the invention to provide a new and improved method for providing remote supervision of a plurality of people at different locations at the same time by one person.

It is also an object of the invention to provide a new and improved method whereby one supervisor can, remotely, do the work currently done by four or more supervisors who must be physically present in each supervised location to affect the guided supervision of people in those locations.

It is also an object of the invention to provide a new and improved method for remote supervision that improves staff productivity.

It is also an object of the invention to provide a new and improved method for remote supervision that frees the time of the remote supervisor in order to allow the supervisor to direct supervision and oversight services to persons in other locations.

It is also an object of the invention to provide a new and improved method for providing remote supervision of persons with cognitive disabilities living independently of each other.

It is also an object of the invention to provide a new and improved method for increasing the independence of persons with cognitive disabilities requiring assisted living services.

It is also an object of the invention to provide a new and improved method for providing remote supervision of people with cognitive disabilities living independently of each other requiring assisted living services which utilizes an integrated network of computer hardware and software that provides for an interactive environment between a plurality of persons living independently at spaced apart locations with a remote supervisor.

It is also an object of the invention to provide a new and improved method for providing improved remote supervision of a plurality of people at different locations living independently of each other with significantly less man hours.

It is also an object of the invention to provide a new and improved method for providing remote supervision of several people with cognitive disabilities in different locations by a single remotely positioned supervisor in a society in which the number of persons needing such supervision is increasing and the number of skilled supervisors is decreasing.

It is also an object of the invention to provide a new and improved communication system that permits interactive communication between a remote supervisor and a plurality of people with cognitive disabilities at different locations living independently of each other.

It is also an object of the invention to provide a new and improved communication system that utilizes a plurality of interconnected audio, visual, and physical sensory displays, signals and prompts to supervise a plurality of persons at spaced remote locations.

It is also an object of the invention to provide a new and improved communication system with a means for effectively and efficiently effecting communication, for operating the plurality of displays, signals and prompts, and for collecting, organizing and accessing information to be exchanged between a remote supervisor location and a plurality of spaced active locations supervised thereby.

Finally, it is an object of the invention to provide a new and improved method and system having all of the above identified features.

In the broader aspects of the invention, there is a provided a new and improved method for supervising and monitoring people from a remote location comprising the use of a communication system that builds upon telecommunications connections, computer interfaces, and information management via the internet. Strategically placed web cams, microphones, speakers, and display monitors are operatively linked to computers and information management means, and are used to permit a person in a remote location to view and listen to people in a plurality of active location to verbally or visually prompt responses to inquiries or directives. The people in the active locations may also interact via these same interconnections to the person at the remote location. Touch screen technology may be included for purposes of automated supervision of tasks performed to accomplish a particular routine by the people in the active locations. Safety devices, such as smoke detectors, carbon monoxide detectors and intrusion detectors, may also be installed to warn a remotely located supervisor, the police or fire departments, or emergency medical services.

BRIEF DESCRIPTION OF THE DRAWINGS

The above mentioned and other features and objects of the invention and manner of attaining them will become more apparent and the invention itself will be better understood by reference to the following description of an embodiment of the invention taken in conjunction with the accompanying drawings wherein.

DESCRIPTION OF SPECIFIC EMBODIMENTS

Figure 1:
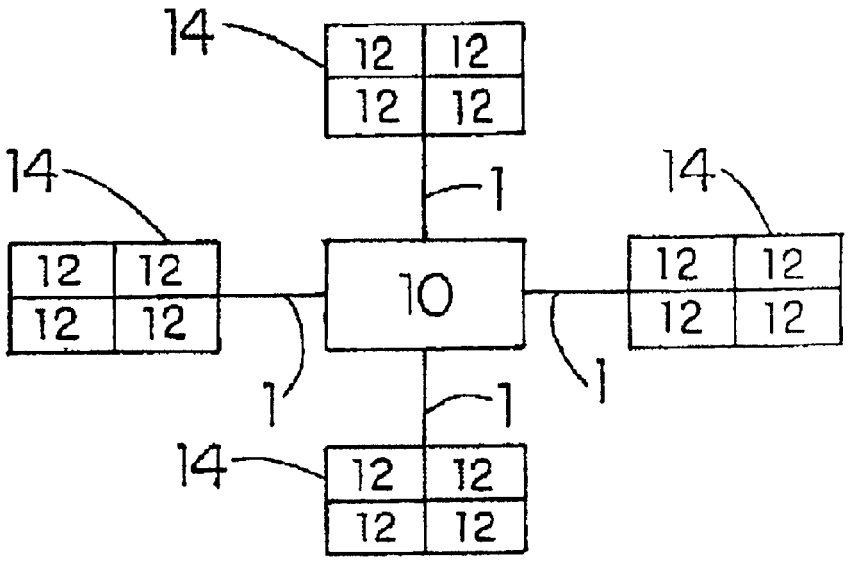
FIG. 1 is a diagrammatic illustration of the new and improved method for communicating between a remote location and a plurality of distinct active locations, showing connection of the remote location to the active locations via a communication system.
Figure 2:
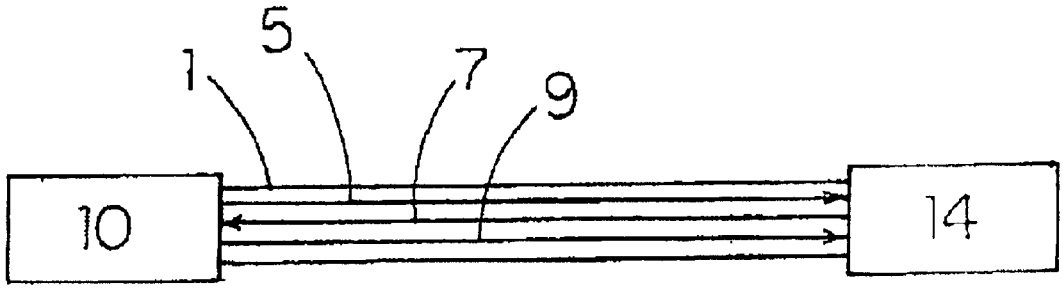
FIG. 2 is a diagrammatic illustration of prompting multiple actions to be performed at an active location and acknowledgment of performance at that location.
Figure 3:
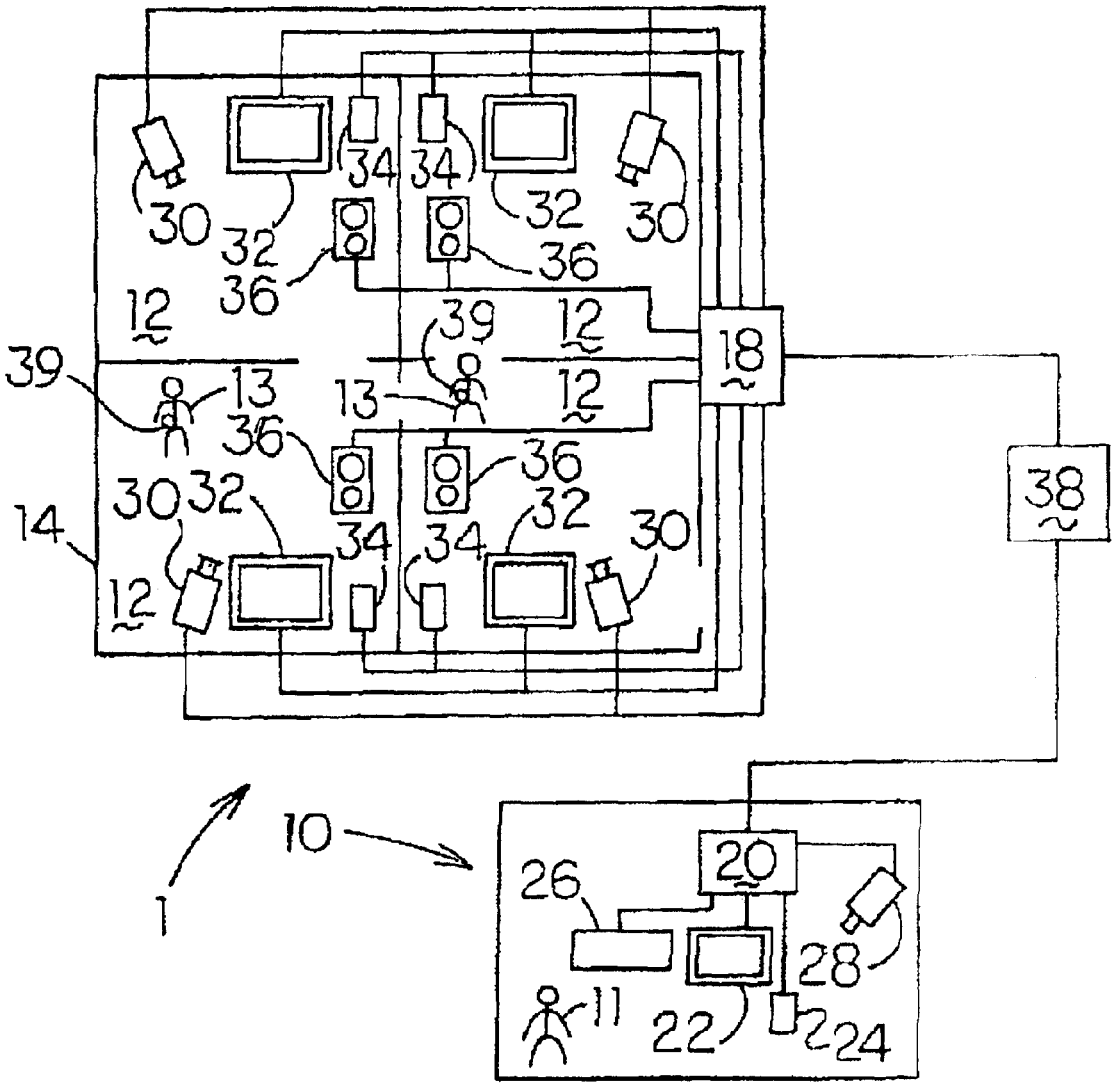
FIG. 3 is an illustration of an embodiment of a communication system between a remote supervision location and an active location.
Figure 4:
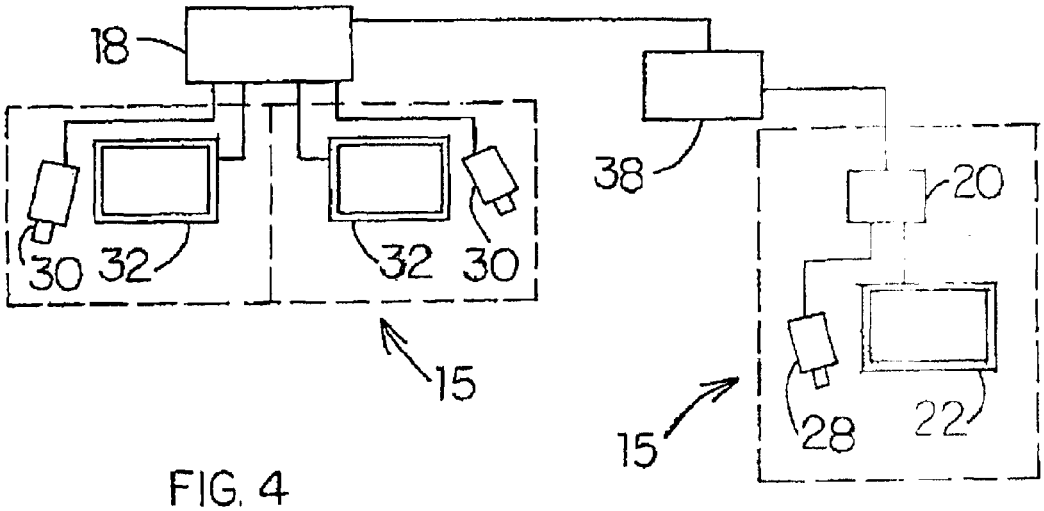
FIG. 4 is a diagrammatic illustration of a video system.
Figure 5:
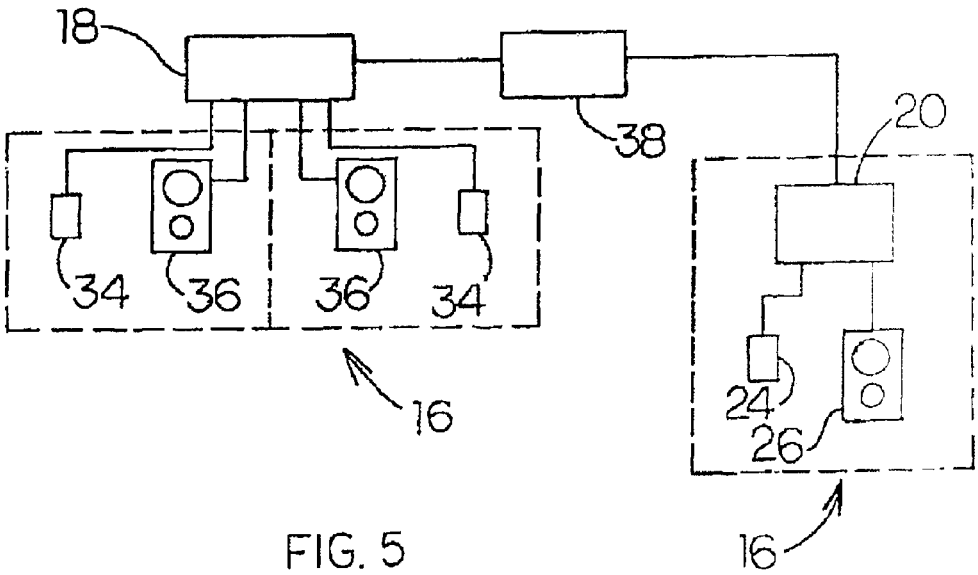
FIG. 5 is a diagrammatic illustration of an audio system.

FIGS. 1 through 9 illustrate various aspects of the new and improved method for remote supervision and a communication system utilized thereby. FIGS. 1 and 2 illustrate the supervisory relation of a remote supervision location to a plurality of distinct active locations and the communicative steps included in effective and efficient supervision therebetween. FIGS. 3, 4 and 5 illustrates a communication system having a video system and an audio system which communicates sights and sounds from one or more interconnected rooms at an active location to a remote location, and vice versa. FIGS. 6 through 9 illustrate individual systems that may be included in any specific embodiment of the present invention.

Referring now to FIGS. 1 through 5, a communication system 1 for remote supervision is provided such that a person 11 at a remote location 10 can monitor and supervise one or more persons 13 in one or more rooms 12 at an active location 14. In a specific embodiment, the communication system 1 utilizes visual and audio surveillance and the exchange of information between the locations in order to permit persons in either location to observe and communicate with one or more persons in the other location. Visual and audio surveillance may be accomplished by way of a video system 15 and an audio system 16. The exchange of information may be accomplished byway of a plurality of multi-faceted telecommunications connections and a central information exchanging means 38.

Referring now to FIG. 2, a method for remote supervision of the present invention permits a person 11 at a remote location 10 to supervise the performance of actions or tasks performed by one or more persons 13 at one or more active locations 14. In a specific embodiment, the actions or tasks, when performed properly and in order, comprise a complete routine, such as a daily living routine like preparing a meal. In other specific embodiments, the person 11 is an assisted living supervisor overseeing one or more persons 13 with mild to moderate cognitive disabilities in a community living environment, such as an apartment. In yet other specific embodiments, the person 11 assists persons 13 in multiple living environments located in multiple spaced apart locations.

In order for a person 13 to complete a routine, the supervisor 11 prompts the person 13 to perform the multiple actions required to complete the routine step-by-step, one action at a time, and in order. In a specific embodiment, the prompting is carried out using the communication system 1. The supervisor 11 at the remote location 10 prompts 5 performance of the first action in a routine at one of the active locations 14. The supervisor 11 then awaits acknowledgment 7 from the person 13 at the active location 14 that the action has been performed. In other specific embodiments, acknowledgment 7 by the person 13 comprises acknowledgment of receipt of the prompt 5, but also further communication indicating that the person 13 requires assistance in performing the action prompted. In yet other specific embodiments, acknowledgment 7 by the person 13 comprises communication indicating that the person 13 requires in-person assistance such as a physical visit by a supervisor or other assisted living staff person other than the supervisor 11 who is on-call for such visits in the geographic area where the active location is located.

If no acknowledgment 7 is received by supervisor 11 within an agreed upon period of time, supervisor 11 repeats the prompt 5 and again awaits acknowledgment 7 from the person 13 at the active location 14. In a specific embodiment, the supervisor 11 repeats the prompt 5 until acknowledgment 7 is received. Once acknowledgment 7 is received, the supervisor 11 prompts 9 performance of a second action in a routine to be performed by the person 13 at the active location 14. For each action in a routine to be performed by the person 13 at the active location 14, the supervisor 11 prompts the performance of each and awaits acknowledgment thereof, repeating as described above if needed, until all actions in a given routine are completed.

In a specific embodiment, the communication system 1 allows the supervisor 11 to oversee the performance of actions by persons 13 in distinct active locations 14 independent of each other. In other specific embodiments, the person 11 can, through the communication system 1, oversee the independent performances of actions in distinct active locations 14 that take place during the same or approximately the same time period. In yet other specific embodiments, the communication system 1 allows the supervisor 11 to oversee such independent performances of actions in three or more distinct active locations 14, which performances may take place during the same or approximately the same time period at each distinct active location 14.

In a specific embodiment, the communication system 1 permits the supervisor 11 to prompt the person 13 with audio prompts. In other specific embodiments, the communication system 1 permits the supervisor 11 to prompt the person 13 with visual prompts. In yet other specific embodiments, the communication system 1 permits the supervisor 11 to prompt the person 13 with physical sensory prompts. In yet other specific embodiments, the severity of the prompt 5, 9 from supervisor 11 can be controlled by the communication system 1 by volume, brightness, frequency of repetition, degree of physical sensitivity, and any other characteristic of the prompt that may be controlled to by the communication system 1 be indicative of severity.

Referring now to FIG. 3, the communication system 1 comprises a video system 15 and an audio system 16. The video system 15 comprises cameras 28, 30 and monitors 22, 32 in both locations that allow a person in either location to view a person in the other location. Cameras 30 are mounted in one or more of the interconnected rooms 12. In a specific embodiment, a camera 30 is strategically located in a room 12 in a way that maximizes the view of the room through the camera. In other specific embodiments, each camera 30 is moveable in order to scan the room 12. Each such camera 30 is operatively linked to information exchanging means 38. In a specific embodiment, the cameras 30 are first operatively connected to a first server 18 used for the particular active location 14, which is then in communicative connection with the information exchanging means 38. In a specific embodiment, the cameras 30 are operatively linked to the first server 18 using contemporary video cable connections between the camera and the first server. In other specific embodiments, the cameras 30 may be operatively linked to the first server 18 using wireless means for transmitting a signal from each camera 30 to the first server 18.

The video system 15 further comprises at least one remote camera 28 mounted at the remote location 10. In a specific embodiment, the remote camera 28 is strategically located at the remote location 10 in a way that maximizes the view of a person 11 at the remote location through the remote camera. The remote camera 28 is operatively linked to the information exchanging means 38. In a specific embodiment, the remote cameras 28 are first operatively linked to a second server 20 used for the remote location 10, which is then in communicative connection with the information exchanging means 38. In a specific embodiment, the remote camera 28 is operatively linked to the second server 20 using contemporary video cable connections between the remote camera and the second server. In other specific embodiments, the remote camera 28 may be operatively linked to the second server 20 using wireless means for transmitting a signal from the remote camera to the second server.

Monitors 32 are placed in one or more of the interconnected rooms 12. Each monitor 32 is operatively linked to the information exchanging means 38 or first to the first server 18. In a specific embodiment, a monitor 32 is operatively linked to the first server 18 using contemporary video cable connections between the monitor and the first server. In other specific embodiments, a monitor 32 may be operatively linked to the first server 18 using wireless means for transmitting a signal from the first server to the monitor. A remote monitor 22 is placed at the remote location 10. The remote monitor 22 is operatively linked to the information exchanging means 38 or first to the second server 20. In a specific embodiment, the remote monitor 22 is operatively linked to the second server 20 using contemporary video cable connections between the remote monitor and the second server. In other specific embodiments, the remote monitor 22 may be operatively linked to the second server 20 using wireless means for transmitting a signal from the second server to the remote monitor.

In order for a person 11 at the remote location 10 to view images perceived by the cameras 30 in the rooms 12 at the active location 14, and for persons 13 at the active locations 14 to view images of the remote location perceived by the remote camera 28, the video signals generated by the cameras 30 and the remote camera 28 are delivered to the remote monitor 22 and the monitors 32, respectively, via the central information exchanging means 38. In a specific embodiment, video signals perceived by the cameras 30 in the rooms 12 at the active location 14 are sent to a first server 18 which then delivers them to a second server 20 via the central information exchanging means 38, and the second server 20 then delivers those signals to the remote monitor 22 for being converted to video images. In other specific embodiments, a person 13 in the rooms 12 at the active location 14 can view video images taken by the remote camera 28 at the remote location 10 as a result of video signals sent from the remote camera 28 to a second server 20 which delivers the video signals to a first server 18 via the central information exchanging means 38, and the first server 18 sends the video signals to the monitors 32 for being converted to video images at the active location.

Referring now to FIG. 5, the audio system 16 comprises speakers 26,36 and microphones 24,34 in both locations that allow a person in either location to audibly communicate with a person in the other location. Microphones 34 are placed in one or more of the interconnected rooms 12. Each microphone 34 is operatively linked to the information exchanging means 38. In a specific embodiment, the microphones 34 are first operatively linked to a first server 18. In other specific embodiments, a microphone 34 is operatively linked to the first server 18 using contemporary audio cable connections between the microphone and the first server. In yet other specific embodiments, a microphone 34 may be operatively linked to the first server 18 using wireless means for transmitting a signal from the microphone to the first server. The audio system 16 further comprises at least one remote microphone 24 placed at the remote location 10. The remote microphone 24 is operatively linked to the information exchanging means 38. In a specific embodiment, the remote microphone 24 is first operatively linked to a second server 20. In a specific embodiment, the remote microphone 24 is operatively linked to a second server 20 using contemporary audio cable connections between the remote microphone and the second server. In other specific embodiments, the remote microphone 24 may be operatively linked to the second server 20 using wireless means for transmitting a signal from the remote microphone to the second server.

Speakers 36 are placed in one or more of the interconnected rooms 12. Each speaker 36 is operatively linked in the information exchanging means 38. In a specific embodiment, the speakers 36 are first operatively linked to a first server 18. In a specific embodiment, a speaker 36 is operatively linked to the first server 18 using contemporary audio cable connections between the speaker and the first server. In other specific embodiments, a speaker 36 may be operatively linked to the first server 18 using wireless means for transmitting a signal from the first server to the speaker. The audio system 16 further comprises at least one remote speaker 26 placed at the remote location 10. In a specific embodiment, the remote speaker 26 is operatively linked to the information exchanging means 38. In a specific embodiment, the remote speaker 26 is first operatively linked to a second server 20. In other specific embodiments, the remote speaker 26 is operatively linked to the second server 20 using contemporary audio cable connections between the remote speaker and the second server. In yet other specific embodiments, the remote speaker 26 may be operatively linked to the second server 20 using wireless means for transmitting a signal from the second server to the remote speaker.

In order for a person 11 at the remote location 10 to hear sounds perceived by the microphones 34 in the rooms 12 at the active locations 14, and for persons 13 at the active location 14 to hear sounds from the remote location 10 perceived by the remote microphone 24, the audio signals generated by the microphones 34 and the remote microphone 24 are delivered to the remote speaker 26 and the speakers 36, respectively, via the central information exchanging means 38. In a specific embodiment, audio signals generated by the microphones 34 in the rooms 12 at the active location 14 are sent to a first server 18 which then delivers them to a second server 20 via the central information exchanging means 38, and the second server 20 then delivers those signals to the remote speaker 26 for being converted to sound. In other specific embodiments, a person 13 in the rooms 12 at the active location 14 can hear sounds from the audio signals generated by the remote microphone 24 at the remote location 10 as a result of audio signals sent from the remote microphone 24 to the second server 20 which delivers the audio signals to the first server 18 via the central information exchanging means 38, and the first server 18 sends the audio signals to the speakers 36 for being converted to sound at the active location 14.

A supervisor 11 may additionally use physical sensory signals to prompt or communicate with a person 13 at an active location 14. In a specific embodiment, such physical sensory signals are provided by a pager 39 having vibratory notification capabilities. In other specific embodiments, the pager 39 may also have audible notification capabilities, such as beeping, to provide audio signal prompts. In yet other specific embodiments, the pager 39 is wirelessly operatively linked to the information exchanging means 38 and/or the first and second servers 18,20.

Figure 6:
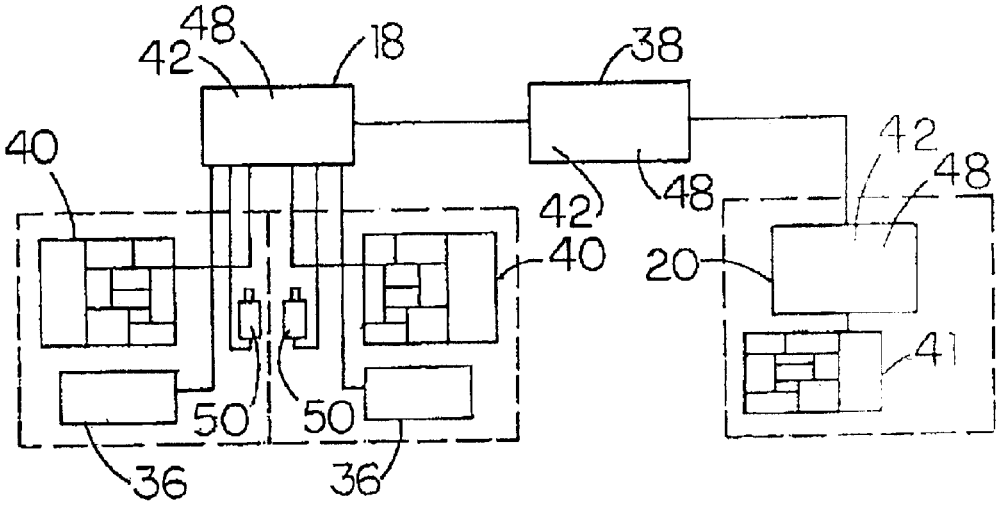
FIG. 6 is a diagrammatic illustration of a touch screen system having an audio prompt for running a basic living routine in the proper order of steps.

Referring now to FIG. 6, supervision by a person 11 at the remote location 10 of persons 13 in the rooms 12 at the active locations 14 is augmented by a means for automating the gathering of information from the active locations 14 and the processing and running of task-driven routines to be performed by persons 13 in the rooms 12. In a specific embodiment, the means for automating such steps comprises a system of touch screens 40 operatively connected to the information exchanging means 38. The touch screens may be activated by software 42 for generating the touch screen interface, managing the operability of the touch screens, and for directing the flow of information input to the touch screen or provided through the touch screen. In other specific embodiments, this software 42 is executed by the first server 18 for use at the active location 14. In yet other specific embodiments, this software 42 is additionally executed by the second server 20 for use at the remote location 10. In yet other specific embodiments, touch screens 40 are placed in one or more rooms 12 at the active location 14 for use by the persons 13 therein. The touch screens 40 are operatively connected to the first server 18. In a specific embodiment, the touch screens 40 are operatively connected to the first server 18 using appropriate cables. In other specific embodiments, the touch screens 40 are connected to the first server 18 using a wireless means for transmitting a signal between the touch screen and the first server. In yet other specific embodiments, the touch screen 40 is operatively connected to the first server 18 only at times required for downloading or uploading information between the touch screen and the first server. A display monitor 41 is placed at the remote location 10, which display monitor is operatively connected to the second server 20. Information input to the touch screen 40 and managed by the software 42 is accessible to a supervisor 11 at the remote location 10. The first server 18 delivers the information to the second server 20 via the central information exchanging means 38. From the remote location 10, a person 11 may access and additionally manipulate the information through the display monitor 41.

Information input through the touch screens 40 by persons 13 in rooms 12 at the active locations 14 is compiled by the software 42 and utilized in and adapted for use with specific tasks comprising a general routine. The routine and its multiple actions or tasks are compiled add stored on the first server 18. In other specific embodiments, the routine and its multiple actions or tasks are additionally compiled and stored on the second server 20. Software 48 for sequencing a routine is executed by the first server 18. In other specific embodiments, the sequencing software 48 is additionally executed by the second server 20. In yet other specific embodiments, the sequencing software 48 is alternatively executed through the central information exchanging means 38.

The sequencing software 48 utilizes the touch screens 40 in the rooms 12 to prompt persons 13 at the active locations 14 to perform tasks in the routine in the proper sequence. In other embodiments, the sequencing software 48 additionally utilizes audio signals sent to the speakers 36 of the audio system 16 to audibly prompt the persons 13 at the active location 14 to perform tasks in the given routine in the proper sequence. In a specific embodiment, at least one notice indicator 50 is placed in each room where a task in a routine is performed, which indicator 50 signals the sequencing software 48 of the first server 18 when activated by a person 13 at the active location 14 to acknowledge that the action has been completed by the person. In other specific embodiments, the notice indicator 50 is a portable mechanism comprising a button to be depressed to send a signal using a wireless means to send the signal to the first server 18 to be received and acted upon by the sequencing software 48.

In a specific embodiment, the audio prompts provided by the sequencing software 48 are repeated for each task after a certain amount of time prescribed by the sequencing software has passed, in the event that the notice indicator 50 has not sent a signal to the first server 18 in that amount of time. In other specific embodiments, the sequencing software 48 prescribes a limited number of repeated audio prompts, after which the sequencing software signals the person 11 at the remote location 10 through the display monitor 41 via the central information exchanging means 38 to prompt the person at the remote location to interact with the person 13 at the active location 14 regarding completion of the task required by the proper sequence of the routine being performed.

Figure 7:
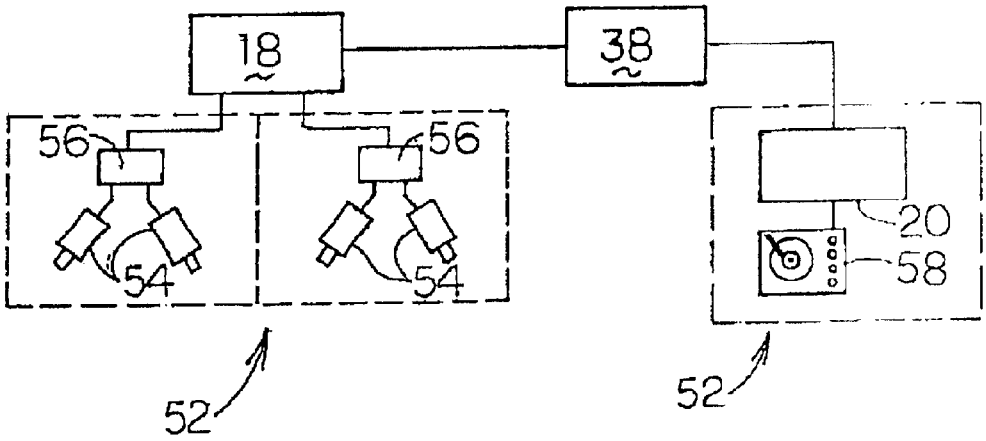
FIG. 7 is a diagrammatic illustration of a light system.

Referring now to FIG. 7, supervision by a supervisor 11 at the remote location 10 of persons 13 at the active locations 14 is supplemented by prompts that focus the attention of persons at the active location on items within the rooms requiring their attention. In a specific embodiment, the supplemental prompt is provided by a controllable lighting system 52. In other specific embodiments, the lighting system 52 comprises a plurality of lights 54 strategically mounted in one or more of the rooms 12. In yet other specific embodiments, a means 56 for mechanically controlling the direction in which each light 54 is facing, for controlling the brightness of the light, and for controlling a strobing function is connected to each light. The controlling means 56 is operatively linked to the first server 18 or to the information exchanging means 38, and is controlled by a controller 58 located at the remote location 10 and operatively linked to the second server 20. The supervisor 11 at the remote location 10 uses the controller 58 to send signals to the controlling means 56 via the central information exchanging means 38. In a specific embodiment, the controlling means 56 is operatively linked to the first server 18 using a wireless means for transmitting a signal from the first server to the controlling means. In other specific embodiments, the controller 58 is operatively linked to the second server 20 using a wireless means for transmitting a signal from the controller to the second server. The signal sent from the controller 58 at the remote location 10 reaches the controlling means 56 via the central information exchanging means 38. In a specific embodiment, the supervisor 11 at the remote location 10 uses the controller 58 to cause the light 54 to point to and light up a particular item in the room 12 that needs the attention of the persons 13 in the room. In other specific embodiments, the supervisor 11 uses the controller 58 to cause the light 54 to flash to get the attention fo the person 13. In yet other specific embodiments, the brightness and the frequency of repetition of the flashing light 54 is indicative of the severity of the supervisor's attempts to prompt the person 13 for any particular purpose. Other systems for visually or audibly focusing the attention of persons at the active location on items requiring their attention may also be used as appropriate and adequate for this purpose.

Figure 8:
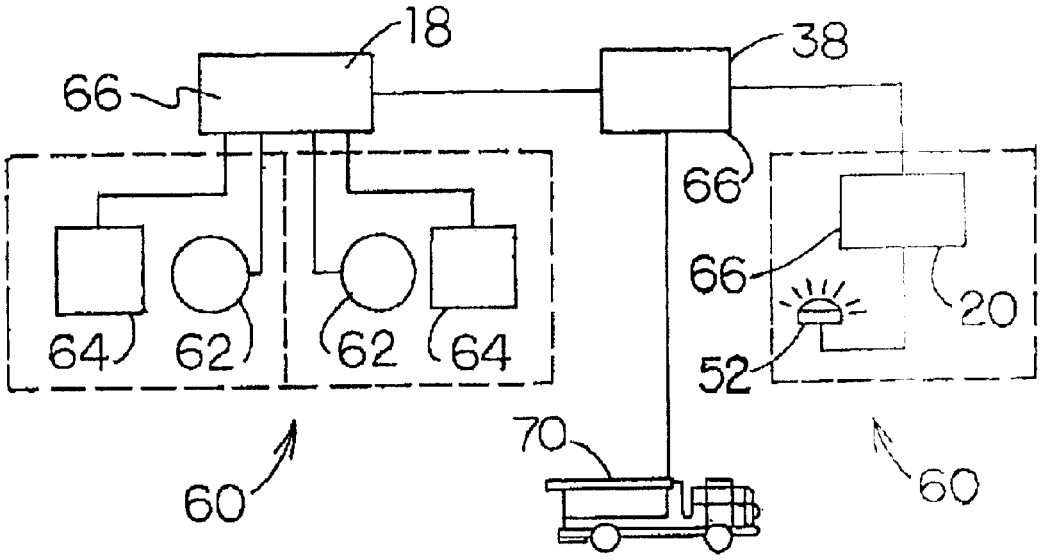
FIG. 8 is a diagrammatic illustration of a safety system.

Referring now to FIG. 8, the communications system 1 of the present invention is additionally supplemented by a safety system 60 for monitoring and reacting to hazards at the active locations 14. In a specific embodiment, the safety system 60 comprises one or more detection mechanisms operatively linked to the information exchanging means 38. In yet other specific embodiments, the safety system is first operatively linked to the first server 18. Software 66 may be utilized in the safety system 60 for monitoring the status of the mechanisms. In other specific embodiments, the detection mechanism comprises a smoke detector 62 for detecting smoke and fire hazards. In yet other specific embodiments, the detection mechanism comprises a carbon monoxide detector 64 for detecting high levels of carbon monoxide. In yet other specific embodiments, the detection mechanism comprises intrusion detectors. The monitoring software 66 may be executed by the information exchanging means 38 or by the first server 18. In yet other specific embodiments, the monitoring software 66 may be executed additionally by the second server 20. When a detection mechanism detects a threshold level that indicates the presence of a safety hazard, the mechanism sends a signal to the monitoring software 66. In a specific embodiment, the monitoring software 66 sets off an alarm in the rooms 12 at the active location 14. In other specific embodiments, the monitoring software 66 sets off an alarm that causes the central information exchanging means 38 to send a signal to the local fire department 70. In yet other specific embodiments, the monitoring software 66 sets off an alarm that causes a signal to be sent from the first server 18 via the information exchanging means 38 to the second server 20 to be perceived by the person 11 at the remote location 10 to notify that person of the safety hazard in the active location.

Figure 9:
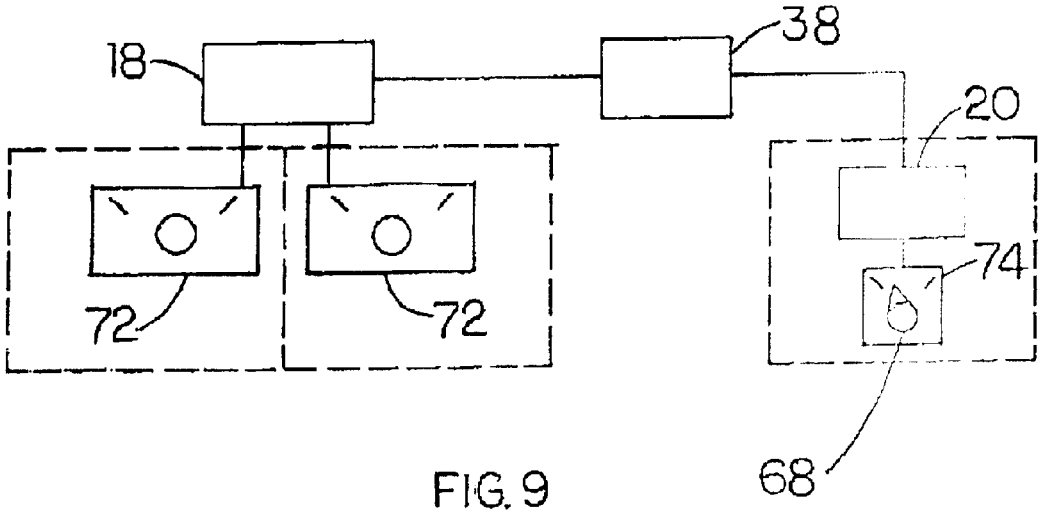
FIG. 9 is a diagrammatic illustration of a means for activating and deactivating the communication system of the present invention.

Referring now to FIG. 9, the communication system 1 may be deactivated during anticipated times of non-use, such as overnight hours or other hours of inactivity at the active location. In a specific embodiment, a means for effecting activation and deactivation of the communication system 1 is placed at each location. In other specific embodiments, an emergency activation means 68 is placed in one or more of the rooms at the active location to cause immediate activation and communication with a supervisor 11 at the remote location 10 in the event the communication system 1 is deactivated.

In the communication system 1 for remote supervision of the present invention, information is exchanged between the remote location 10 and the active location 14 via the central information exchanging means 38. In a specific embodiment, information is first collected and organized at each location by a server having computing capabilities. The information comprises video signals from the cameras 30 and the remote camera 28 converted to pictures and displayed by the monitors 32 and the remote monitor 22, audio signals generated by the microphones 34 and remote microphone 24 and converted to sound by the speakers 36 and the remote speakers 26, information input to the touch screens 40 and display monitor 41 and provided through the touch screens and display monitor, and safety information regarding the presence of hazards at the active location 10. In a specific embodiment, each of the first 18 and second servers 20 contain and execute specific software for computing, compiling, managing, manipulating, and otherwise utilizing, exploiting, and delivering particular information required for adequate remote supervision. In order to facilitate the exchange of information between each location, each of the first 18 and second servers 20 communicate through the central information exchanging means 38. In a specific embodiment, the information exchanging means 38 comprises an internet web site accessed by both servers. In other specific embodiments, the web site provides means for inputting and storing information from each location. In yet other specific embodiments, the web site provides means for accessing and manipulating information input at one location from the other location. In yet other specific embodiments, the web site provides means for delivering information from one location to the other location. Access to the web site is protected by a password required to be entered by any person attempting to access the web site, and/or encryption.

In a specific embodiment, each of the servers 18, 20 is operatively connected to the central information exchanging means 38 via telecommunications connections. In other specific embodiments, the servers 18, 20 are connected to the central information exchanging means 38 through DSL telephone lines. In yet other specific embodiments, the servers are connected to the central information exchanging means 38 through a cable modem system.

Figure 10:
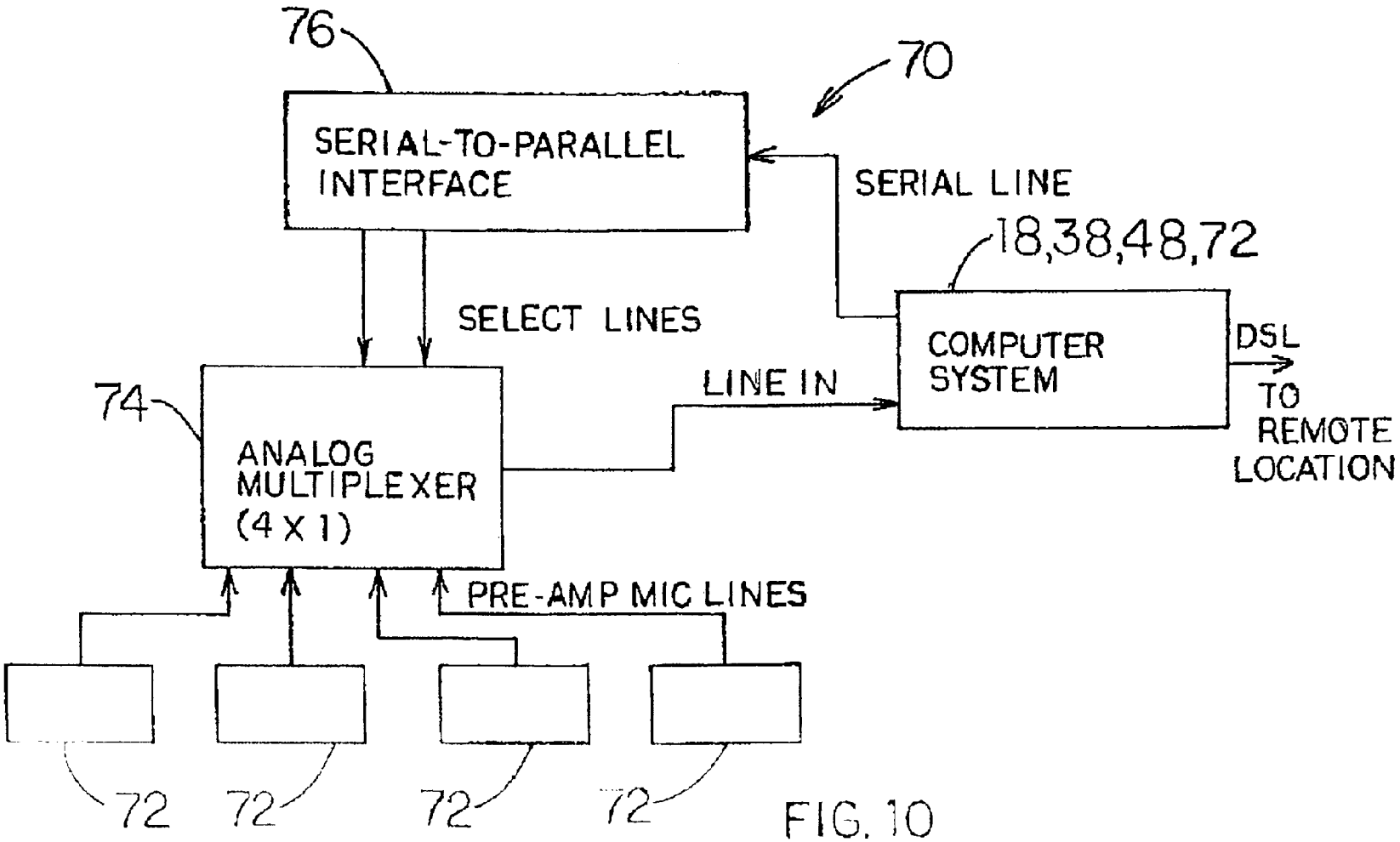
FIG. 10 is a diagrammatic illustration of a switching mechanism of the communications system of the invention.

In specific embodiments, the use of a single monitor, microphone, speakers, touch screen, video camera and light actuator at the remote location 10 may require a switching mechanism to be installed between each of the active locations 14 and the remote location 10. Whenever the active locations include multiple microphones, multiple speakers, multiple video cameras, multiple video monitors, multiple touch screens and light actuators and the remote location has a single video monitor, microphone, speaker, video camera, light actuator and touch screen, the central information exchanging means 38 and sequencing software 48 includes a switching mechanism 70 whereby the supervisor 11 at remote location 10 may selectively activate specific video monitors, microphones, speakers, video cameras, light actuators and touch screens at the active location 14. The switching mechanism 70 is shown in FIG. 10 to include multiple identical input devices 72 connected to an analog multiplexer 74 interconnected between a serial to parallel interface 76 and a computer system connected to the remote location 10. By this means, communication of the method disclosed herein may be positioned utilizing one or more input or output devices as selected by the remote supervisor 11. In a specific embodiment, the active user 13 and of the remote supervisor 11 may determine which input devices and which output devices are actuated at any one time.

By installing the remote supervision system of the present invention, a supervisor 11 may perform the method for supervising and monitoring persons located at one or more active locations 14, each containing one or more rooms, from a remote location using visual and audio prompts or other prompts. In a specific embodiment, the method of supervision and monitoring is augmented by using an automated touch screen system. In yet other specific embodiments, the method of supervision and monitoring is supported by using a supplemental visual prompting system, such as a light system 52. In yet other specific embodiments, the method of supervision and monitoring is additionally supplemented by a safety monitoring system 60. The method of supervision and monitoring with automated augmentation and supplementation permits one person to remotely supervise more than one active location 14 from a single remote location 10.

The following example illustrates a specific embodiment of the present invention.

Example 1

Strategically placed video and audio systems, comprising web cams, microphones, speakers and display monitors in a community living apartment site for supervision of adults with cognitive disabilities permit a staff person located at a remote location to be electronically linked to the rooms at that site. Transmission of surveillance information at the site, generated from the video and audio systems, occurs via a DSL telephone line or cable modem system.

The web cams are placed in the living room and kitchen of each apartment housing a disabled person. Speakers and microphones are disbursed throughout the same areas, as well as in other rooms at the site. Display and touch screen monitors are located in the apartment in strategic locations convenient for the disabled person to see and use while engaging in activities of daily living. All of these devices are linked to a computer that, in turn, is connected to the DSL line or cable modem system.

At the remote location, a web cam is trained on a single staff person simultaneously. This staff person also has immediate access to a microphone linked to the speakers at the site. The microphones at the site are linked to speakers audible to the staff person at the remote location. The staff person's computer is also connected to a DSL line or a cable modem system to enable communication between the staff person and the disabled person via a secure web site, which manages the exchange of surveillance information between the site and the remote location and which stores and controls information inputted by both the staff person and the disabled person. The web site is secured by means of a password and/or encryption so that the public does not have access to it.

Through these devices, the disabled person can communicate with and receive supportive prompts from the staff person at the remote location. Because of the video and audio systems, the disabled person is able to both hear the staff person and see him. The remote staff person can provide the same verbal prompts and feedback statements to the disabled person as would be given by a direct services staff person on a face-to-face basis. This includes such things as awakening the disabled person, reminding them to take a shower, asking them if they have performed daily hygiene tasks, observing and giving feedback on the disabled person's selection of clothes, giving verbal or visual assistance during meal preparation activities, helping them plan a daily schedule, and prompting them to leave for work or to catch the bus on time. The electronic transmission of positive feedback from the staff person reinforces desired behavior just as in face-to-face situations. This feedback is both verbal and visual through use of the speakers and monitors.

Special software and touch screen technology permit the remote supervisor to assist the disabled person through more complex home living or community living tasks. This includes the preparation of weekly menus, specific meals, planning weekly social activities, and cleaning schedules. The software and touch screen technology is adapted from the current use of picture-books with the cognitively disabled for this purpose by direct services staff persons. With picture-books, the staff person obtains the disabled person's verbal preferences using a picture-book showing choices for different meals. The preferences are then recorded and a menu plan prepared. Picture-books also assist with performing routines, such as meal preparation, by showing pictures sequenced in accordance with the tasks of the routine. In the present invention, touch screen technology with the appropriately customized software automates this process, for any number of routines.

The customized software is run by the computer at the site and controls the touch screen technology also linked to that computer. The touch screen monitors may be full size or as small as a Palm Pilot® or other similar hand-held device with touch screen capabilities, with a hot-sync option for downloading information to the on-site computer. The use of a Palm Pilot® type device allows for greater portability about the community living environment. As used for food and menu preparation, the menu possibilities are represented on the touch screen and the disabled person makes a selection for each meal by pressing the desired item. The software then automatically compiles the selections into a menu plan, complete with itemized lists of ingredients. Once the meal is chosen, its preparation is highly automated, as well. Visual tasks associated with preparation of a particular meal are automatically displayed by the software application on the touch screen in the proper sequence. Automated verbal prompts are also built into the software program as a supplement to the visual cues offered on the touch screen. The automated verbal prompts are broadcast over the speakers at the site, or integrated into the touch screen. The staff person is relegated to oversight during these complex activities, rather than active involvement.

Verbal prompts associated with the general daily living routines of each disabled person are also automated in the touch screen technology used in this system. Through planning discussions with each disabled person, the preferences for their daily routine are determined, just as for menu planning. This includes such things as the time they want to wake up in the morning, whether they prefer to shower before or after breakfast or in the evening before retiring, times they need to leave for work, when they prefer to have meals, and times when they must take medication. In each daily living routine are tasks that need to be performed in sequence, which the disabled person often has difficulty remembering. Once the disabled person's preferences are collected regarding each routine, they are inputted to the customized software on the on-site computer. Automated verbal prompts related to each routine task are then scheduled for broadcast over the speakers in the apartment at the time each routine is run. As a key task in each routine is completed in sequence, the disabled person is verbally prompted to press a feedback button located in each room at the site. These buttons may be wireless transmission devices that send a feedback signal to the computer at the site. Once the signal is received, the special software records that task as complete and moves along to the next key task in the routine. If the signal is not received, the software sends another verbal prompt for the disabled person to complete the task or press the button if they have completed the task. If the software fails to receive this feedback response after a prescribed time, the software sends an alert to the staff person at the remote location. The staff person then electronically inquires about the status of the disabled person and whether they need help completing the task.

Other visual prompts are also adapted electronically. A light source supplants the gestural cues often given by direct services staff persons in face-to-face situations, such as meal preparation activities. The light may be manipulated to focus on a particular object by the staff person, using a controller at the remote location, when the disabled person does not respond to a verbal prompt, thus directing their attention to the item.

The advanced features of the new and improved system additionally ensure safety in each living environment as well. Smoke 62 and carbon monoxide 64 detectors are electronically linked to the on site computer 18. A software program constantly monitors this safety equipment. In the event of an alert, the remote staff person, as well as the fire department 70, are notified immediately.

The communication system may be shut down by switch 74 during non-intervention times, such as during sleeping hours. However, the disabled person can still use the system in the event of emergencies. A panic button 72 is available at the site to provide immediate contact with the remote staff person. When pushed, this button automatically activates the communication system.

Example 2

Utilizing the communications system of the invention in the manner described in Example 1, supervisor 11 at the remote location 10 would activate the microphone, speaker 36, video monitor 32, video camera 30 and touch screen 40 with active locations 14 and lead the active person 13 through specific routines. In performing the routine of washing dishes, specific activities would be set forth on the monitor with pictures showing someone doing the particular activity, the active person 13 would be prompted to do the activity shown on the monitor by any one or more of the variety of means disclosed until the activity was completed. The video monitor 32 would then show the next activity of the routine and the prompting would be repeated until that activity was completed, and so on. In this manner, the entire routine would be prompted and supervised and completed in accordance with the method of the invention. The specific activities of a dishwashing routine would include the following:

Pick up the kitchen garbage container

Go to the kitchen sink

Put the garbage container on the floor next to the sink

Scrape excess food off each dirty plate into garbage container

Put all dirty dishes in one of the two sinks

Push the faucet over the empty sink

Turn on the water

Test the water with hand to see if it is warm

Turn faucet knob for more hot/cold water until it is running warm

Open cabinet door under sink

Take out the rubber gloves

Put on the rubber gloves

Take out rubber dish tub from the cabinet under sink

Put rubber tub in sink under the running water

Close kitchen cabinet

Pick up dish soap at edge of sink

Put one squirt of soap into rubber tub

When tub fills to top, push faucet to other sink with dirty dishes

Take dirty dish from other sink and put in rubber tub

Pick up sponge from edge of sink and dunk in soapy water

Pick up dish from tub with other hand

Wipe all sides of dirty dish with soapy sponge

Put down sponge into tub

Rinse soapy dish under running water

Put clean dish in dish rack beside sink to dry

The monitoring of each of these activities of the dishwashing routine would be used with a person 13 who had little skill in this particular task and who needed maximum guidance. Some of the prompts may be eliminated if the cognitively disabled consumer 13 had more skill in this particular area. A few general prompts would be needed to get the more highly skilled consumer through the entire routine. The training goal would be to get the cognitively disabled consumer 13 to a point where they would go through the whole routine of the steps above following one general prompt to "wash the dishes," with the supervisor being able to stop the consumer and re-start the consumer appropriately when the consumer deviated from the routine.

The new and improved method for remote supervision allows the same staff person to serve a plurality of cognitively disabled consumers in four or more different apartments at the same time. This is achieved through the use of web server software, allowing the monitor for the staff person to be divided into quadrants. Each quadrant would be a visual and auditory link to a different apartment where one or more disabled persons live. In this way, one staff person could do the work currently done by four or more staff who must be physically present in each apartment to effect guided supervision of the disabled persons.

The new and improved method of the present invention further improves staff productivity. For example, disabled persons' choices for menu or social planning made with a touch screen would be automatically recorded and compiled into a weekly meal menu or social activity plan. This can be displayed for the disabled person at their discretion at the touch screen. Disabled persons could be taught to independently access this information, or request assistance in assessing it from the remote supervisor.

The new and improved method of the present invention also frees the remote guidance supervisor's time, allowing the supervisor to direct supervision and oversight of additional disabled persons in other community living settings. This one staff person might than be able to cover the living arrangements of six to eight or more disabled persons.

The new and improved method of the present invention provides capabilities for remote supervision of persons with cognitive disabilities living independently of each other. The new and improved method also increasing the independence of persons with cognitive disabilities requiring assisted living services. The new and improved method additionally provides remote supervision of people with cognitive disabilities living independently of each other requiring assisted living services by utilizing an integrated network of computer hardware and software that provides for an interactive environment between a plurality of persons living independently in remote locations with a separately living supervisor. The new and improved method also provides improved remote supervision of a plurality of people at different locations living independently of each other with significantly less man hours. Moreover, the new and improved method provides remote supervision of more people with less supervisors.

The new and improved method of the present invention provides remote supervision of several people in different locations by a single remotely positioned supervisor in a society in which the number of persons needing such supervision is increasing and the number of skilled supervisors is decreasing.

The new and improved system of the present invention provides a new and improved communication system that permits interactive communication between a remote supervisor and a plurality of people at different locations living independently of each other. The new and improved communication system of the present invention utilizes a plurality of interconnected audio, visual, and physical sensory displays, signals and prompts. The new and improved communication system of the present invention also comprises a means for effectively and efficiently effecting such communication, for operating the plurality of displays, signals and prompts, and for collecting, organizing and accessing information to be exchanged between the remote location and the different active locations supervised thereby.

Finally, the new and improved method and system for remote supervision provides all of the above identified features.

While a specific embodiment of the invention has been shown and described herein for purposes of illustration, the protection afforded by any patent which may issue on this application is not strictly limited to the disclosed embodiment; but rather extends to all structures and arrangements which fall fairly within the scope of the claims which are appended hereto.

What is claimed is:

1. A method for interactive communication between one or more spaced apart active locations, each having one or more rooms therein, and a single remote supervision location comprising the steps of providing a communication system between said remote supervision location and each of said active locations, said communication system including an audio system and a visual system, said communication system selectively providing communication between each of said active locations and said remote supervision location, selectively prompting a first action at one of said spaced apart active locations through use of said communication system, awaiting at said remote supervision location for acknowledgment of the performance of said first action at said one active location, repeating said first-action prompting step and said awaiting step if no acknowledgment is received at said remote supervision location within an agreed upon response time until an acknowledgment is received at said remote supervision location, receiving acknowledgment from said one active location through said communication system of the performance of said first action, and selectively prompting a second action to be performed at said one active location through said communication system after receipt of acknowledgment that said first action is completed, whereby multiple actions to be performed at multiple spaced apart active locations may be monitored and supervised from a single remote supervision location.

2. The method of claim 1 wherein said first-action prompting, awaiting, repeating and second-action prompting steps are a part of supervising a step-by-step performance of a task at one or more of said spaced apart active locations.

3. The method of claim 1 further comprising the steps of selectively prompting a first action at another of said spaced apart active locations through use of said communication system, awaiting at said remote supervision location for acknowledgment of the performance of said first action at said other active location, repeating said first-action prompting step and said awaiting step if no acknowledgment is received at said remote supervision location within an agreed upon response time until an acknowledgment is received at said remote supervision location, receiving acknowledgment from said other active location through said communication system of the performance of said first action, and selectively prompting a second action to be performed at said other active location through said communication system after receipt of acknowledgment that said first action is completed at said other active location.

4. The method of claim 3 wherein said steps to be performed at said one active spaced apart location are performed independently of said steps to be performed at said other spaced apart active location.

5. The method of claim 4 wherein said steps performed at said one active location are performed during the same time period as the steps to be performed at said other active location.

6. The method of claim 3 further comprising the steps of prompting a first action at a third of said spaced apart active locations through use of said communication system, awaiting at said remote supervision location for acknowledgment of the performance of said first action at said third active location, repeating said first-action prompting step and said awaiting step if no acknowledgment is received at said remote supervision location within an agreed upon response time until an acknowledgment is received at said remote supervision location, receiving acknowledgment from said third active location through said communication system of the performance of said first action, and selectively prompting a second action to be performed at said third active location through said communication system after receipt of acknowledgment that said first action is completed at said third active location.

7. The method of claim 6 wherein said steps to be performed at said one and other active locations are performed independently of said steps to be performed at said third active location.

8. The method of claim 7 wherein said steps performed at said one and other active locations are performed during the same time period as the steps to be performed at said third active location.

9. The method of claim 6 further comprising the steps of selectively prompting a first action at a fourth of said spaced apart active locations through use of said communication system, awaiting at said remote supervision location for acknowledgment of the performance of said first action at said fourth active location, repeating said first-action prompting step and said awaiting step if no acknowledgment is received at said remote supervision location within an agreed upon response time until an acknowledgment is received at said remote supervision location, receiving acknowledgment from said fourth active location through said communication system of the performance of said first action, and selectively prompting a second action to be performed at said fourth active location through said communication system after receipt of acknowledgment that said first action is completed at said fourth active location.

10. The method of claim 9 wherein said steps to be performed at said one, other and third active locations are performed independently of said steps to be performed at said fourth active location.

11. The method of claim 10 wherein said steps performed at said one, other and third active locations are performed during the same time period as the steps to be performed at said fourth active location.

12. The method of claim 11 wherein a plurality of processes simultaneously being performed at a plurality of spaced apart locations may be monitored and supervised by a single person from said remote supervision location on a single monitor and performed by one or more persons at each of the plurality of spaced apart locations during the same time frame.

13. The method of claim 1 wherein prompts for each of said first-action prompting steps and each said second-action prompting steps are to be chosen from the group of prompts consisting of audio prompts, visual prompts, physical sensory prompts, and combinations thereof.

14. The method of claim 13 wherein the manner of providing said prompts is capable of indicating different severities of prompting.

15. The method of claim 1 further comprising the step of physically visiting said active location if multiple prompting is not acknowledged.

16. The method of claim 1 wherein said acknowledgment includes a communication chosen from the group consisting of acknowledgments that the action was performed, acknowledgments of receipt of the prompt but needing help, acknowledgment of needing a physical visit, or a combination of the same.

17. The method of claim 1 wherein said communication system comprises at least one video camera, video monitor, audio speaker, audio microphone, and light system installed in each of said active locations, and a video camera, a video monitor, an audio speaker, an audio microphone located at said remote supervision location, said video cameras, video monitors, audio speakers, audio microphones, and light system being operatively interconnected through an information exchanging means for simultaneous communication of video pictures, audio messages, audio signals, and visual signals between said remote supervision location and said active locations and for operation of said remote video cameras and visual signals and combinations thereof, said information exchanging means including computing means for communicating prompts of actions, acknowledgements of completion of actions, recording data, assembling data, displaying data and reporting data in a variety of formats, whereby multiple actions to be performed in multiple spaced apart active locations may be monitored and supervised from a single remote supervision location.

18. The method of claim 17 further comprising a pager worn by one or more persons at said spaced apart active locations being monitored and supervised from said remote supervision location; said pager being wirelessly operatively interconnected to said information exchanging means, whereby said prompts and acknowledgements may be performed through said pager.

19. The method of claim 17 wherein both said video monitors and the lights in the rooms of said active location may be utilized to display visual signals and prompts.

20. The method of claim 17 wherein said video monitors include touch screens operatively connected to said information exchange means, said touch screens collecting, organizing and accessing information contained in said information exchanging means, and providing communication between said video monitors.

21. A communication system for enabling interactive communication between one or more spaced apart active locations having one or more rooms therein and a single remote supervision location, comprising at least one video camera, [video monitor,] audio speaker, *and* audio microphone[, and light flasher] installed in each of said active locations, and [a video camera,] a video monitor, an audio speaker, and an audio microphone located at said remote supervision location, [each of] said video camera[s], video monitor[s], audio speakers, audio microphones [located at both of said locations] being operatively interconnected through an information exchanging means for selective simultaneous communication of video pictures, audio messages, audio signals, and visual signals between said remote supervision location and said spaced apart active locations, and for selective operation of said video cameras, visual signals, audio speakers, audio signals, and selective combinations thereof, said information exchanging means including computing means for communicating prompts of actions, acknowledgements of completion of actions, recording data, assembling data, displaying data and reporting data in a variety of formats, whereby multiple actions to be performed in multiple spaced apart active locations may be monitored and supervised from [a] *the* single remote supervision location.

22. The communication system of claim 21 further comprising a pager worn by one or more persons being monitored and supervised from said remote supervision location, said pager being wirelessly operatively interconnected to said information exchanging means, whereby each of said prompts and acknowledgements may be performed through said pager.

23. The communication system of claim 21, *further including a light in at least one of said rooms of said one or more spaced apart active locations,* wherein [both said video monitors and lights in said rooms of said active locations] *said light* may be utilized to provide visual signals [and prompts].

24. The communication system of claim 21 wherein said video monitors include touch screens operatively interconnected to said information exchange means, said touch screens collecting, organizing and accessing information contained in said information exchanging means, and providing interactive communication between said video monitors at said remote supervision location and at said active locations.

25. The communication system of claim 21 further comprising means for shutting down said communication system during non-intervention hours, said means having a panic button thereon, said panic button signaling said remote supervision location and activating of the communication system.

26. The communication system of claim 21 further comprising smoke [and] *or* carbon monoxide detectors interconnected to said information exchange means, said smoke [and] *or* carbon monoxide detectors signaling said remote supervision location when activated.

27. The communication system of claim 25 wherein said smoke [and] *or* carbon monoxide detectors also signal emergency communication system of the local fire department [and] *or* police department.

28. The method of claim 17 wherein said video cameras are moveable to scan the room in which is located.

29. The method of claim 17 further comprising at least one detection mechanism and a detection mechanism receiver operably interconnected through said information exchanging means, said detection mechanism being chosen from the group of detection mechanisms consisting of smoke detectors, carbon monoxide detectors, motion detectors, intrusion detectors, door break sensors, window break sensors, and combinations thereof.

30. The [method] *communication system* of claim 21 wherein said video camera[s are] *is* moveable to scan the room in which *the video camera* is located.

31. The [method] *communication system* of claim 21 further comprising at least one detection mechanism and a detection mechanism receiver operatively interconnected through said information exchanging means[, said detection mechanism being chosen from the group of detection mechanisms consisting of smoke detectors, carbon monoxide detectors, motion detectors, intrusion detectors, door break sensors, window break sensors, and combinations thereof].

*32. The communication system of claim 21 further comprising:*

*at least one light flasher installed in at least one active location.*

*33. The communication system of claim 21 further comprising:*

*a video camera located at said remote supervision location.*

*34. A communication system for enabling interactive communication between one or more spaced apart active locations and a remote supervision location, comprising:*

*at least one video camera, audio speaker, and audio microphone installed in said one or more active locations, and*

*a video monitor, an audio speaker, and an audio microphone located at said remote supervision location,*

*said video camera, video monitor, audio speakers, and audio microphones located at said locations being operatively interconnected for selective simultaneous communication of video pictures, audio messages, audio signals, and visual signals between said remote supervision location and said one or more spaced apart active locations, and for selective operation of said video cameras, visual signals, audio speakers, audio signals, and selective combinations thereof,*

*means for sequentially communicating prompts of actions to said one or more active locations and for confirming completion of the actions at the remote supervision location,*

*whereby multiple actions to be performed in the one or more spaced apart active locations may be monitored and supervised from the remote supervision location.*

*35. A method for interactive communication between one or more spaced apart active locations and a remote supervision location comprising the steps of*

*providing a communication system between said remote supervision location and each of said active locations, said communication system comprising an audio system and a visual system, said communication system selectively providing communication between each of said active locations and said remote supervision location,*

*selectively prompting a first action at one of said spaced apart active locations through use of said communication system,*

*awaiting at said remote supervision location for confirmation of the performance of said first action at said one active location,*

*repeating said first-action prompting step and said awaiting step if no confirmation is received at said remote supervision location until confirmation is received at said remote supervision location,*

*receiving confirmation from said one active location through said communication system of the performance of said first action, and*

*selectively prompting a second action to be performed at said one active location through said communication system after receipt of confirmation that said first action is completed, whereby multiple actions to be performed at multiple spaced apart active locations may be monitored and supervised from a remote supervision location.*

*36. The system according to claim 34, wherein the means for sequentially communicating prompts of actions comprises a computer with software for use in prompting the actions.*

*37. The system according to claim 34, wherein the means for sequentially communicating prompts of actions comprises a computer with software for sequencing a routine of actions to be performed for at least one active location.*

*38. The system according to claim 34, further including means for exchanging information associated with the means for sequentially communicating prompts of actions to the active locations and for confirming completion of the actions at the remote supervision location.*

*39. The communication system of claim 21 further comprising:*

*at least one video monitor installed in at least one active location.*

* * * * *